United States Patent
Bladow et al.

(10) Patent No.: US 6,764,119 B2
(45) Date of Patent: Jul. 20, 2004

(54) VEHICLE BUMPER SYSTEM

(75) Inventors: Jeffrey L. Bladow, West Bloomfield, MI (US); Tad V. Machrowicz, Hortonville, MI (US); Steven N. Fidh, Ann Arbor, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 10/349,479

(22) Filed: Jan. 22, 2003

(65) Prior Publication Data

US 2003/0160466 A1 Aug. 28, 2003

Related U.S. Application Data

(60) Provisional application No. 60/350,725, filed on Jan. 22, 2002.

(51) Int. Cl.[7] .............................................. B60R 19/34
(52) U.S. Cl. ....................... 293/155; 293/122; 293/102; 293/132
(58) Field of Search ................................. 293/155, 122, 293/102, 132

(56) References Cited

U.S. PATENT DOCUMENTS

| | | | | |
|---|---|---|---|---|
| 1,626,347 A | * | 5/1923 | Lyon ........................... | 293/155 |
| 1,548,141 A | * | 8/1925 | Jandus ........................ | 293/155 |
| 1,553,562 A | | 9/1925 | Short | |
| 1,591,188 A | * | 7/1926 | Sherizen ...................... | 293/155 |
| 1,615,333 A | * | 1/1927 | Laher .......................... | 293/156 |
| 1,617,903 A | * | 2/1927 | Hammond ................... | 293/155 |
| 1,622,442 A | | 3/1927 | Guenther et al. | |
| 1,623,412 A | * | 4/1927 | Jandus ........................ | 293/155 |
| 1,627,472 A | * | 5/1927 | Watson ........................ | 293/155 |
| 1,649,165 A | * | 11/1927 | Jandus ........................ | 293/155 |
| 1,686,685 A | * | 10/1928 | Dunston ...................... | 293/155 |
| 1,691,885 A | * | 11/1928 | Jandus ........................ | 293/155 |
| 1,694,774 A | * | 12/1928 | Dykstra ....................... | 293/155 |
| 1,739,074 A | * | 12/1929 | Kauffung ..................... | 293/155 |
| 1,771,539 A | * | 7/1930 | Jandus ........................ | 293/155 |
| 1,783,875 A | | 12/1930 | Ferdinand | |
| 1,901,227 A | | 3/1933 | Cossalter | |
| 2,022,668 A | * | 12/1935 | Jandus ........................ | 293/155 |
| 2,030,978 A | * | 2/1936 | Fortier et al. ................ | 293/155 |
| 2,147,745 A | * | 2/1939 | MacKinnon ................. | 293/155 |
| 3,877,741 A | | 4/1975 | Wilfert et al. | |
| 3,997,208 A | | 12/1976 | Nomiyama | |
| 3,999,793 A | | 12/1976 | Roubinet | |
| 4,018,466 A | | 4/1977 | Norlin | |
| 4,142,753 A | | 3/1979 | Klie et al. | |
| 4,386,799 A | | 6/1983 | Molnar | |
| 4,391,464 A | | 7/1983 | Masotti et al. | |
| 4,440,429 A | | 4/1984 | Eyb | |
| 4,460,206 A | | 7/1984 | Peter | |
| 4,533,166 A | | 8/1985 | Stokes | |
| 4,597,601 A | * | 7/1986 | Manning ..................... | 293/122 |
| 4,714,287 A | | 12/1987 | Merkle | |
| 4,749,613 A | * | 6/1988 | Yamada et al. .............. | 293/155 |

(List continued on next page.)

Primary Examiner—Kiran Patel
(74) Attorney, Agent, or Firm—Flynn, Thiel, Boutell & Tanis, P.C.

(57) ABSTRACT

A vehicle bumper system defined principally by outboard and inboard elongate beams which project transversely across the vehicle. The ends of the front and rear beams are joined by connecting points which function as energy-absorbing fulcrums or hinges, with the remainder of the front and rear beams initially being free of direct structural connection. The front beam is outwardly curved so that the center portions of the front and rear beams define a gap therebetween. The rear beam has connections to the vehicle at two points spaced transversely inwardly from the end connections, which connections define inboard fulcrum or hinge points. The front and rear beams are each formed as elongate monolithic structures, such as of high strength steel, and have configurations which enable them to nest one within the other in the longitudinal direction of the vehicle.

14 Claims, 4 Drawing Sheets

U.S. PATENT DOCUMENTS

| | | | |
|---|---|---|---|
| 4,762,352 A | | 8/1988 | Enomoto |
| 4,765,665 A | * | 8/1988 | Akahoshi .................... 293/155 |
| 4,807,915 A | | 2/1989 | Shyi |
| 4,826,226 A | | 5/1989 | Klie et al. |
| 4,961,603 A | * | 10/1990 | Carpenter .................. 293/155 |
| 1,407,637 A | | 2/1992 | Coletta |
| 5,154,462 A | | 10/1992 | Carpenter |
| 5,269,574 A | * | 12/1993 | Bhutani et al. ............. 293/102 |
| 5,277,462 A | | 1/1994 | Verzelli et al. |
| 5,290,079 A | * | 3/1994 | Syamal ...................... 293/122 |
| 5,385,375 A | * | 1/1995 | Morgan et al. ............. 293/122 |
| 5,577,796 A | * | 11/1996 | Clausen ...................... 293/102 |
| 5,957,512 A | * | 9/1999 | Inada et al. ................. 293/155 |
| 5,967,592 A | * | 10/1999 | Freeman ..................... 293/122 |
| 6,007,123 A | * | 12/1999 | Schwartz et al. ........... 293/132 |
| 6,398,275 B1 | * | 6/2002 | Hartel et al. ................ 293/102 |
| 6,435,579 B1 | * | 8/2002 | Glance ....................... 293/105 |
| 6,494,510 B2 | * | 12/2002 | Okamura et al. ........... 293/155 |
| 2003/0034661 A1 | * | 2/2003 | Gotanda et al. ............ 293/155 |

\* cited by examiner

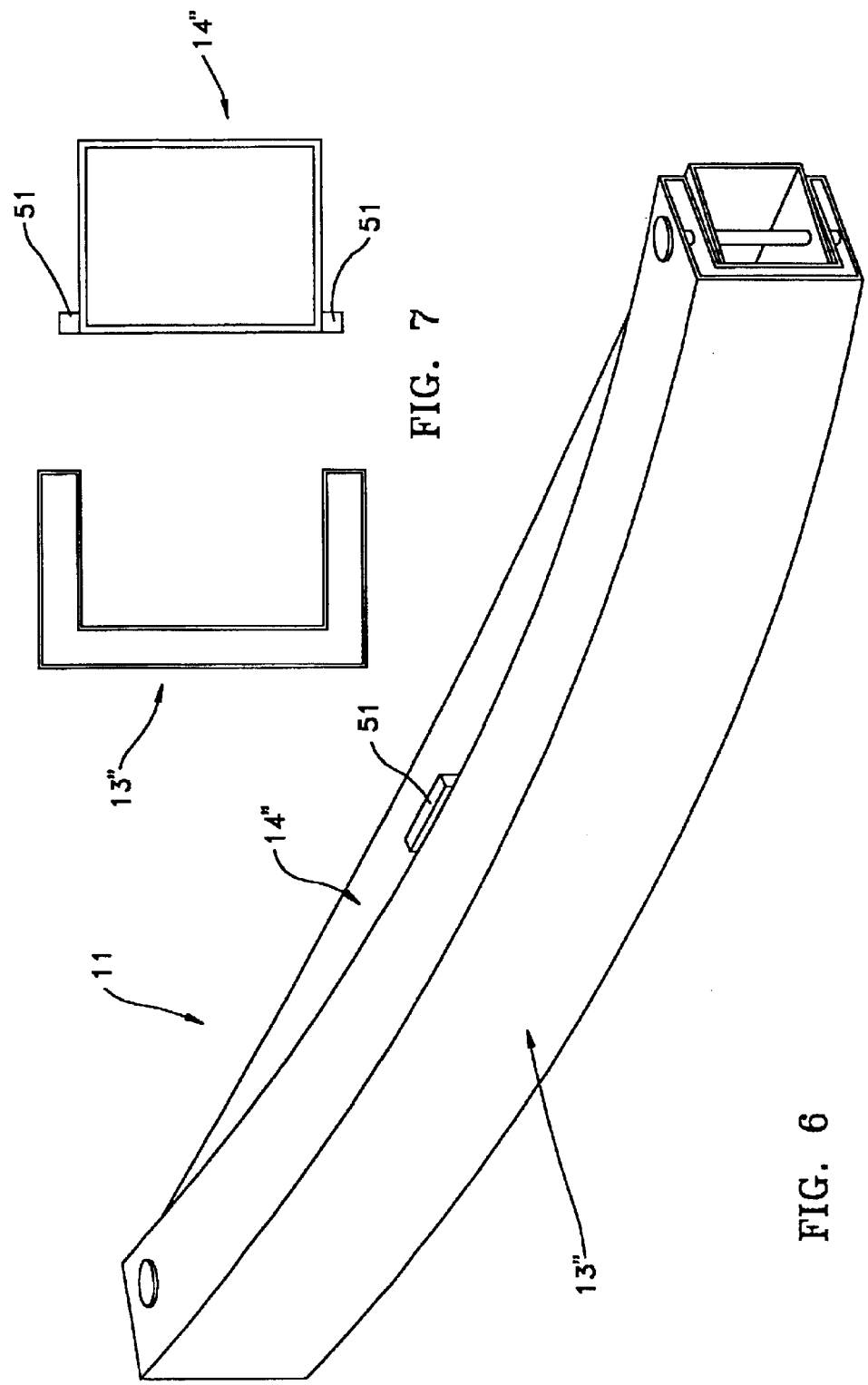

VEHICLE BUMPER SYSTEM

CROSS REFERENCE TO RELATED APPLICATION

This application claims priority under 35 USC §119(e) of copending provisional application Serial No. 60/350,725 filed Jan. 22, 2002, the entire disclosure of which is herein incorporated by reference.

FIELD OF THE INVENTION

This invention relates to a bumper system for a vehicle and, more specifically, to an improved bumper system which can be constructed of small package size while providing high energy absorption capability.

BACKGROUND OF THE INVENTION

Bumpers are used on motor vehicles to absorb low level impact forces and to limit the amount of damage sustained to the vehicle body during high level impacts. In an attempt to achieve this objective, many of the known bumper systems have necessarily resulted in arrangements involving an undesirably large size or space requirement, and in addition have resulted in undesired structural complexity and cost. In addition, it is believed that most such bumper systems have failed to provide for maximum energy absorption resulting from an impact, particularly in relationship to the overall size, weight, cost and protectability of the known bumper systems.

Conventional design practice is to provide a bumper system having a single armature (i.e., a simple beam) which, when impacted, absorbs energy by permitting buckling (i.e., plastic deformation) at locations concentrated at the vehicle centerline of the beam and at the locations where the beam mounts to the vehicle. This arrangement of the simple beam, however, provides an inefficient energy absorbing capability, and hence the bumper system is conventionally provided with separate energy absorbers such as struts, springs or foam members which cooperate with the beam. This conventional design is thus complex and requires significant space to package it on a vehicle, and generally results in an inefficient use of material and often results in a system having significant weight.

The present invention relates to an improved bumper system for a vehicle which attempts to improve on conventional prior art constructions by providing a multiple-beam bumper system which, in conjunction with the connections to the vehicle, define multiple fulcrum points so that the bumper system is effectively defined by multiple beams which permit more effective absorption of energy, as caused by an impact against the bumper, due to relative movements of the beams and the permissible plastic energy-absorbing deformations which occur within the bumper system.

The bumper system of the present invention, as aforesaid, in addition to permitting more effective dissipation of energy within the bumper system prior to the ending of an external impact event, is also believed to represent a bumper system solution which can be more readily and less expensively manufactured and can be incorporated into a smaller package depth by permitting more energy to be dissipated per unit distance of impact intrusion.

In the improved vehicle bumper system of this invention, the system is defined principally by outboard (i.e. front) and inboard (i.e. rear) elongate beams which project transversely across the vehicle. The ends of the front and rear beams are joined by connecting points which function as energy-absorbing fulcrums or hinges, with the remainder of the front and rear beams initially being free of direct structural connection. The front beam is preferably of an outwardly curved configuration so that the center portions of the front and rear beams define a horizontal space or gap therebetween. The rear beam defines the structural connection to the vehicle, and in particular the rear beam at two points disposed on opposite sides of the vehicle longitudinal centerline, and spaced transversely inwardly from the end connections, is joined to mounting elements or rails on the vehicle by connections which define inboard fulcrum or hinge points. The front and rear beams are each preferably formed as elongate monolithic structures, such as of high strength steel, and have configurations which enable them to nest one within the other in the longitudinal direction of the vehicle. For example, one of the beams is preferably of a C-shaped cross section, and the other beam is of a compatible C-shaped or hollow rectangular configuration to enable the two beams to at least partially nest. The two beams, in the nondeformed condition, have the end parts thereof nested together to define the outboard connections thereat. An external impact against the front beam can effect rearward deflection thereof and transmission of energy along the front beam to the outboard connections, which in turn effect energy absorption at the end beam portions of the rear beam which project between the inboard and outboard connections. This also causes the center portion of the rear beam to deflect forwardly toward the front beam to effect additional energy absorption, with the front and rear beams being moved toward one another for more effective nesting engagement so that the two beams ultimately act as one so as to permit additional absorption of the impact energy. Additional connecting blocks can be provided for cooperation between the front and rear beams if desired.

In the improved bumper system of the present invention, as aforesaid, the front and rear beams and their connections to one another at the outboard ends, and the connection of solely the rear beam to the vehicle at the inboard connection points, effectively define a kinematic structure having four connection points which function similar to fulcrums in that they permit energy-absorbing relative motion between the front and rear beams, and between the rear beam and the vehicle frame, with the energy absorption being in various stages as the impact event progresses. Further, the four connection points effectively cause the front and rear beams to define a four-beam system, with the rear beam having three beam portions due to the pairs of inboard and outboard connection points. This in addition enables the center beam portion of the rear beam to undergo outward bowing or deflection (i.e. away from the vehicle) toward the front beam during an impact event so as to improve the energy-absorbing capabilities while at the same time minimizing or delaying the impact of the bumper against the remainder of the vehicle.

Other objects and purposes of the improved bumper system according to the present invention will be apparent to persons familiar with systems of this general type upon reading the following specification and inspecting the accompanying drawings.

BRIEF DESCRIPTION OF THE DRAWINGS

FIG. 6 is a perspective view similar to FIG. 1 but illustrating a bumper system having contact blocks associated with the rear beam.

FIG. 7 is an enlarged central cross-sectional view of the bumper system of FIG. 6.

Figure 1:
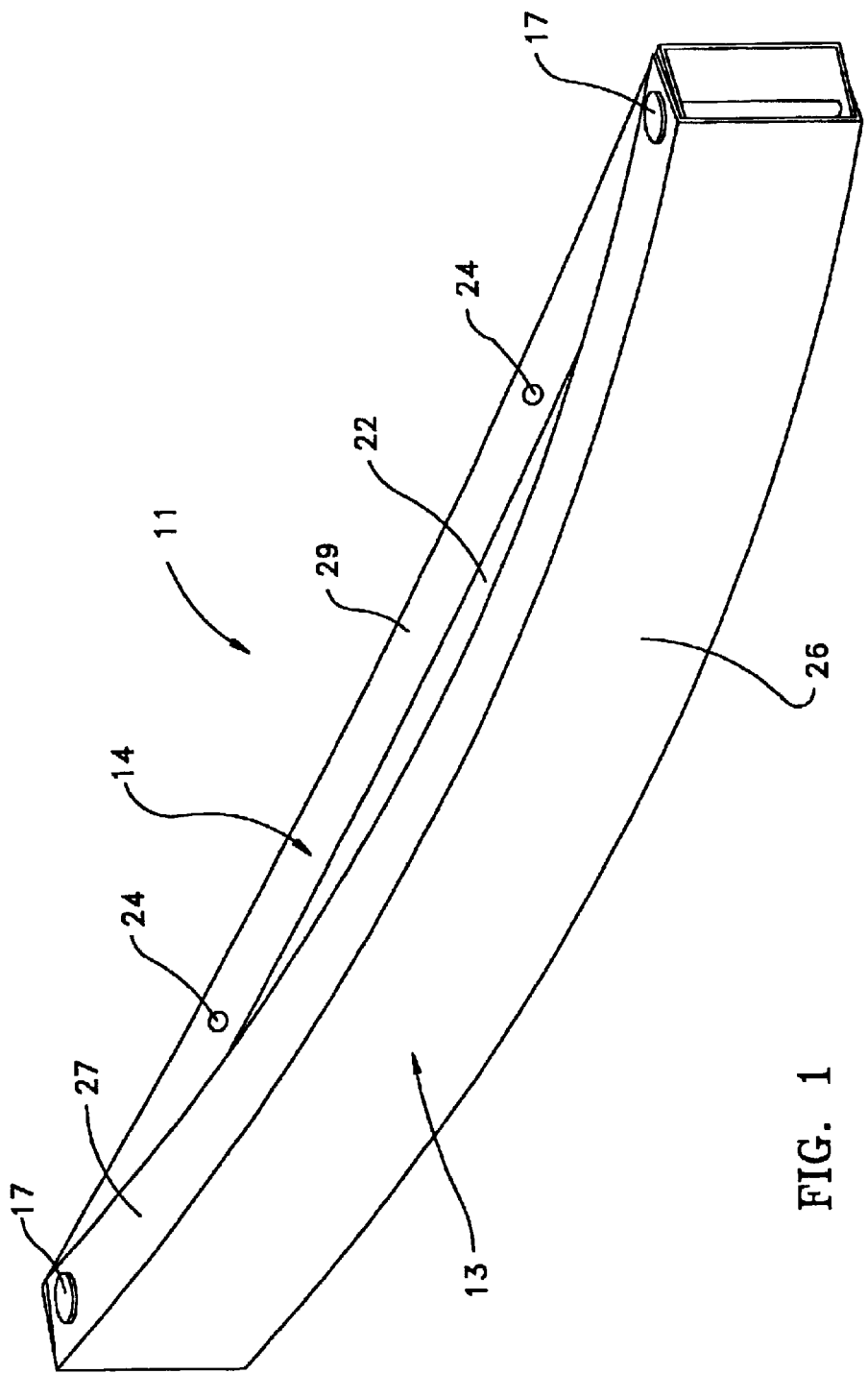
FIG. 1 is a perspective view of an improved bumper assembly according to the present invention.

Certain terminology will be used in the following descriptions for convenience in reference only, and will not be limiting. For example, the words "upwardly", "downwardly", "rightwardly" and "leftwardly" will refer to directions in the drawings to which reference is made. The word "front" will refer to a direction which faces away from the vehicle end, namely upwardly in FIG. 2, and the word "rear" will refer to the opposite direction. The words "inwardly" and "outwardly" will refer to directions toward and away from, respectively, the geometric center of the bumper system and designated parts thereof. Said terminology will include the words specifically mentioned, derivatives thereof, and words of similar import.

DETAILED DESCRIPTION

Figure 2:
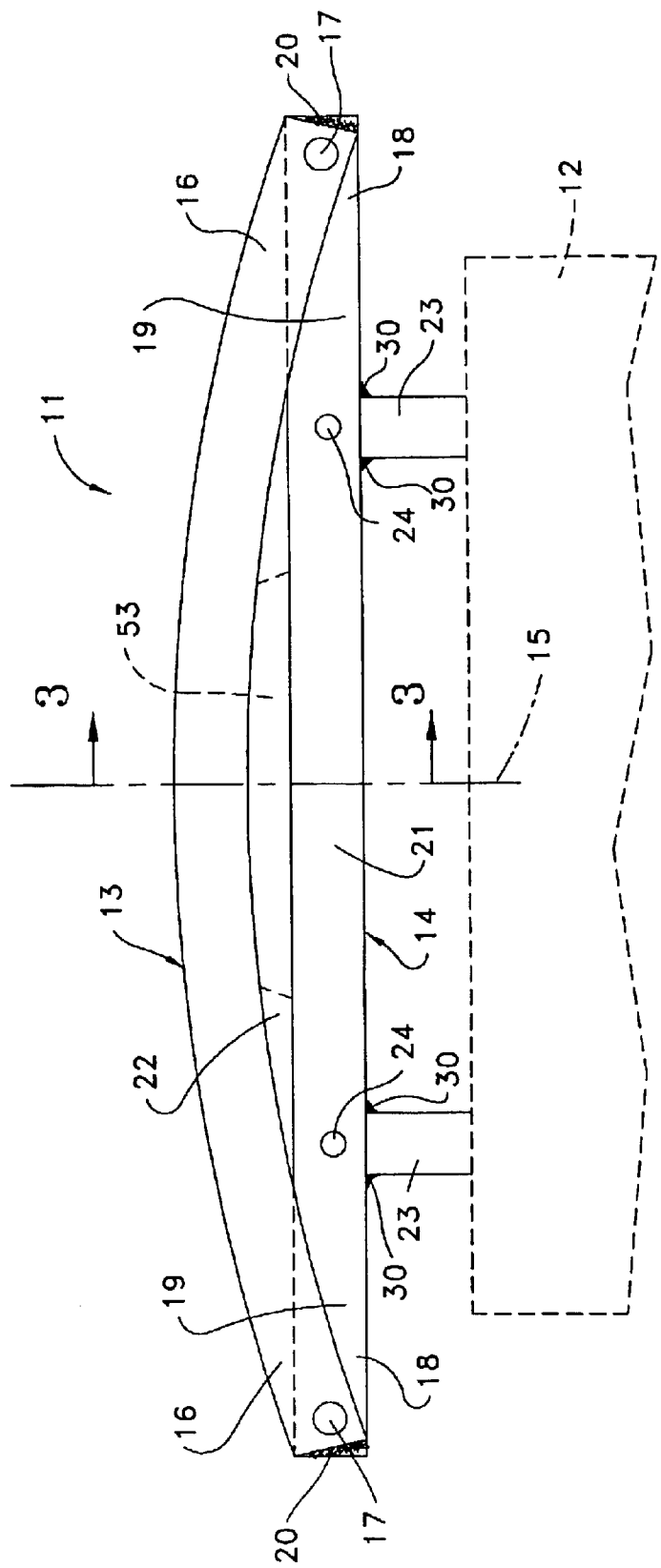
FIG. 2 is a diagrammatic plan view illustrating the inventive bumper system and its connection to a vehicle.

Referring to FIGS. 1 and 2, there is illustrated an improved vehicle bumper system 11 according to the present invention. The bumper assembly 11 is adapted to be mounted on the front and/or rearward end of a vehicle, the frame or basic structure of which is diagrammatically indicated at 12 in FIG. 2.

The bumper assembly 11 is made up principally of two main elongate beams or armatures, namely a rigid front or outboard beam 13 and a rigid rear or inboard beam 14, the latter being interposed in the space between the front beam 13 and the vehicle. The beams 13 and 14 project generally horizontally and transversely with respect to the longitudinal direction of the vehicle, namely the typical direction of vehicle movement, and in plan view as illustrated in FIG. 2 are symmetrical with respective to the longitudinal centerline 15 of the vehicle.

The front beam 13, adjacent opposite free ends thereof, has end portions 16 which are joined by end connections 17 to respective end portions 18 defined at opposite free ends of the rear beam 14. The end connection 17 defines a relatively rigid connection between the ends of beams 13 and 14 so that these beams can relatively rotate or angularly displace at this end connection only in response to application of a significant force-created moment which provides energy absorption and transmission as the bumper assembly deflects and deforms in response to an external impact against the front beam 13. The end connectors 17 thus function as energy-absorbing vertical fulcrums which will typically permit relative angular displacement between the beams in response to application of sufficient energy as to cause plastic energy-absorbing deformation. The end connections 17 provided between the ends of the front and rear beams is the principal structural connection between these elements.

The rear beam 14 in turn provides the principal structural connection to the vehicle, such as to a pair of frame or mounting members (i.e. rails) 23 which are associated with the end of the vehicle for connection to the bumper system. The vehicle mounting members 23 are disposed spaced from and typically symmetrically on opposite sides of the centerline 15, and connect directly to the rear beam 14 by connections 24 which preferably function as vertical fulcrums or hinges.

The pair of connections 24, herein referred to as inboard connections, are spaced inwardly relative to the end or outboard connections 17, whereby the connections 24 have no direct contact or engagement with the front beam 13 when the bumper assembly is in a non-deformed condition. This disposition of the inboard and outboard connections 24 and 17, respectively, causes the rear beam 14 to be effectively divided into three beam portions, namely an elongate center portion 21 which extends between the connection points 24, and a pair of end beam portions 19 which extends between the inboard connections 24 and the adjacent outboard connections 17.

The front beam 13, in a generally horizontal plane, is preferably provided with an outwardly curved or arcuate shaped configuration throughout the lengthwise extent thereof so that it bows or curves outwardly in the longitudinal direction of the vehicle. The rear beam 13 may be straight as illustrated, or may be provided with a forward arcuate or outwardly bowed configuration if desired, although the arcuate shape of the inboard or rear beam 14 would be less than that of the front or outer beam 13. The configuration of the beams 13 and 14 when in the assembled state, and prior to being subjected to an external impact, is such that the center portion of the front beam 13 is spaced forwardly from the center portion 21 of the rear beam 14 so as to define a horizontal gap or space 22 therebetween.

The front and rear beams 13 and 14 are preferably provided with three-dimensional cross sections which, at least in part, involve a C-shaped configuration so as to permit the front and rear beams to effectively nest one within the other, which nesting relationship exists initially only at the ends 16 and 18.

Figure 3:
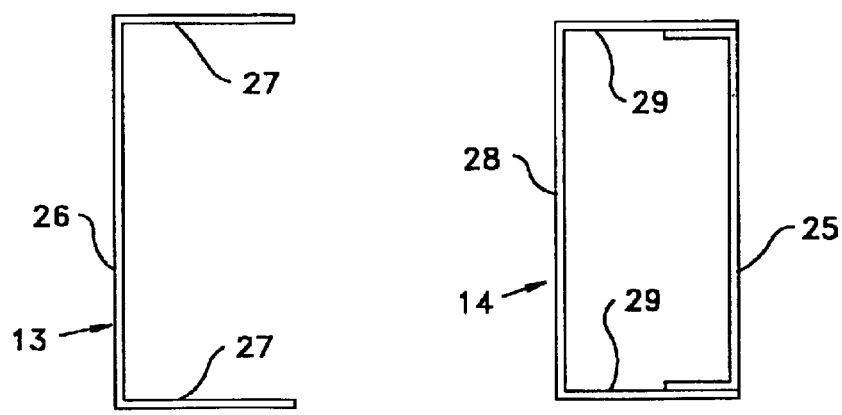
FIG. 3 is an enlarged cross-sectional view taken along line 3—3 in FIG. 2 and showing the cross section of the front and rear beams.

More specifically, as illustrated by FIG. 3, the front beam 13 in one preferred embodiment of the invention has a generally C-shaped cross section which opens rearwardly and is defined by a upright front wall 26 which, at upper and lower ends, joins to rearwardly projecting top and bottom walls or legs 27. The rear beam 14 is of a similar rearwardly-opening C-shaped cross section defined by an upright front wall 28 which at upper and lower edges is joined to rearwardly projecting top and bottom walls or legs 29. The overall height of the rear beam 14 is selected so as to permit it to move into the interior of (i.e., nest within) the front beam 13, the latter having sufficient spacing between the inside surfaces of the top and bottom walls 27 so as to permit the rear beam 14 to be positioned therebetween. This nesting relationship enables the ends 16 and 18 to nest together and permit the front and rear beams to be joined at the connections 17, which connections will typically exist between the overlapping top and bottom walls 27 and 29. The center portions of the beams, however, will be spaced apart as illustrated in FIG. 2, and as illustrated in FIG. 3 wherein the front beam 13 is spaced forwardly from the rear beam 14.

If desired, the overall structural properties of the rear beam 14 can be further enhanced by forming same as a closed tube of generally rectangular cross section. This is achieved in the illustrated embodiment by closing off the C-shaped rear beam by means of a back wall 25, the latter having flanges which can be suitably fixed, as by welding, to the top and bottom walls 29. Alternately, the rectangular profile of the rear member 14 in FIG. 3 can be formed using other structural techniques, such as by roll forming the rectangular tube and then longitudinally seam welding same.

Figure 4:
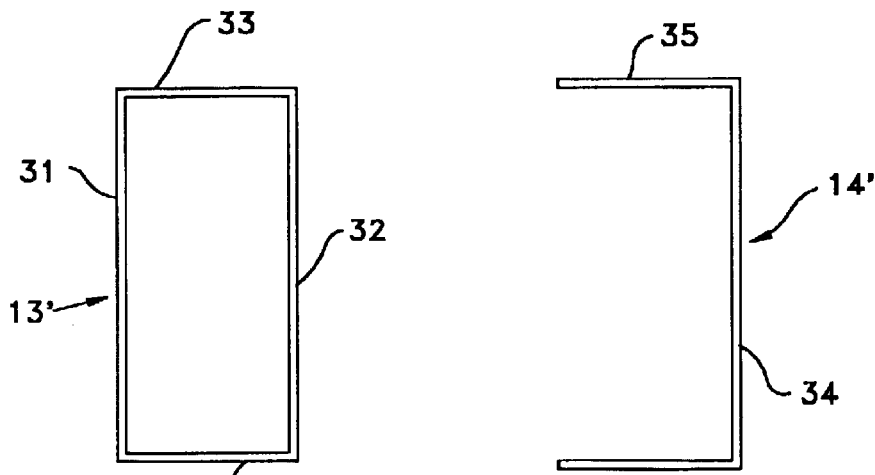
FIG. 4 is a view similar to FIG. 3 but illustrating a variation in the beam cross sections.

As a modification which effectively is a reversal of the arrangement shown in FIG. 3, the front and rear beams can be constructed as illustrated in FIG. 4. In this variation, the front beam 13' has a generally rectangular tubular cross section defined by front and rear walls 31 and 32 respectively, joined by top and bottom walls 33, and the rear beam 14' is a forwardly opening C-shaped cross section defined by an upright rear wall 34 joined to forwardly projecting top and bottom walls 35. The interior of the C-shaped rear beam 14 is sized so as to permit the tubular front beam 13' to nest within the rear beam 14'.

Figure 5:
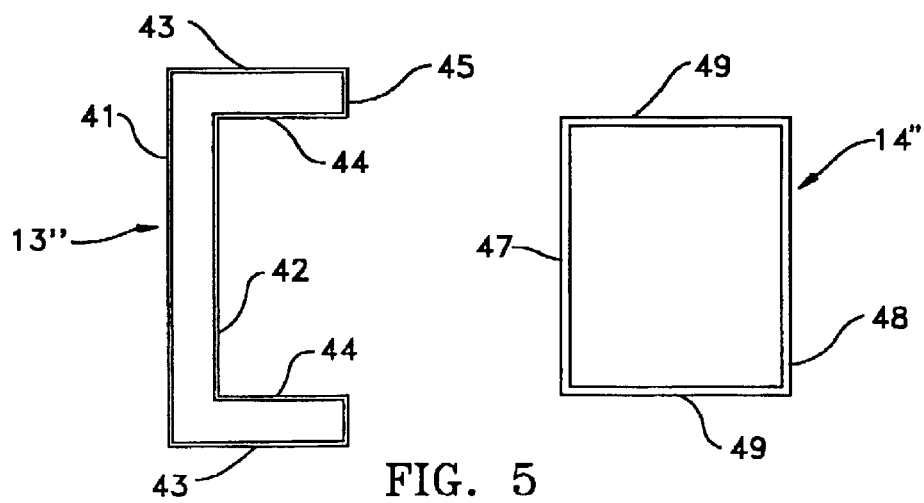
FIG. 5 is a further view similar to FIG. 3 and illustrating a further variation of the beam cross sections.

A still further variation of the cross section of the front and rear beams is illustrated in FIG. 5. In this variation the front beam 13" and rear beam 14" are both of a hollow tubular cross section configured to nest one within the other. More specifically, the front beam 13" is a hollow C-shaped member which opens rearwardly and is defined by spaced outer and inner upright front walls 41 and 42 respectively, and the front beam has rearwardly projecting channel-shaped hollow legs defined by outer top and bottom walls 43 which join to the outer front wall 41, and inner top and bottom walls 44 which join to the inner front wall 42, with the hollow legs being closed off at rearward ends by rear walls 45. The rear beam 14" is of a rectangular tubular cross section defined by upright front and rear walls 47 and 48, respectively, rigidly joined by top and bottom walls 49. The height of the rear beam 14" is such as to permit it to nest within the interior of the C-shaped front beam 13", generally in the recess defined between the upper and lower walls 44.

The front and rear beams 13 and 14, including the variations suggested by FIGS. 3–5, are preferably individually constructed as one-piece monolithic elongate metal members, preferably high strength steel of at least 100 ksi yield strength, with the beams preferably being roll formed so as to provide the beams with desirable shape and strength properties. The front and rear beams 13 and 14 are assembled together, such as through the outboard connectors 17, such that each of the beams 13 and 14 in the assembled condition is in its preformed and hence non-stressed shape. As to the fulcrum connectors 17, they will typically be a rigid or semi-rigid connector which will provide or permit a springlike connection between the front and rear beams adjacent the free ends thereof so that, upon application of an impact force against the front beam, the front beam can deflect inwardly and simultaneously effect transmission of impact energy lengthwise along the beam into the outboard connectors 17 associated with opposite sides of the bumper arrangement. These connectors 17, such as elastically and/or plastically deformable springlike hinges, permit appropriate deflection and movement at the connector so as to absorb additional energy, and at the same time the end beam portions 19 associated with the rear beam 14 can elastically and plastically deflect or deform rearwardly about the inboard connection points 24. This latter deflection will typically be accompanied by forward deflection or bowing of the rear center beam portion 21 toward the center portion of the front beam 13, with this forward deflection of the center rear beam portion 21 effecting absorption of additional impact energy.

As the impact energy continues to be applied to and absorbed in the bumper system, the opposed center portions of the front and rear beams both move, and effectively move in opposite directions toward one another until the center portions effectively nest one within the other. At this stage the front and rear beams thus effectively function as a single beam and are effective for absorbing additional impact energy as the nested center portions of the front and rear beams are deflected rearwardly.

The overall bumper assembly and specifically the construction employing front and rear beams coupled princi-pally by the two outboard connection points 17, and the coupling of the rear bumper member 14 to the vehicle through the two inboard connection points 24, thus effectively provides a four-point kinematic action which enables the impact energy to be progressively absorbed as a result of movement and deformation of the different parts of the front and rear beams in response to an external impact against the front beam. At the same time, the fact that the rear beam is initially deflected outwardly away from the vehicle into engagement with the front beam, prior to its thereafter being effectively coupled with the front beam and deflected inwardly toward the vehicle for further energy absorption, is believed to permit a higher quantity of energy to be effectively absorbed within the bumper system prior to impact of the bumper against the vehicle, with the overall bumper system still occupying only a minimum space envelope when mounted on the vehicle.

Considering in greater detail the energy-absorbing end connections 17 which join the ends of the outboard beam 13 to the respective ends of the inboard beam 14, this connection 17 preferably provides significant rotational resistance between the connected ends of the beams 13 and 14 such that a significant force-created moment is required to effect angular displacement of the connected ends of the beams 13 and 14, which in turn results in significant absorption of impact energy as imposed on the bumper system. This energy-absorbing end connection 17 hence may absorb some energy due to elastic deformation of the material associated with the beams or the end connection, but more significantly causes energy absorption due to plastic deformation of the material.

The end connection 17, in a typical and practical construction of the bumper assembly, may be created by a welded connection between the beams 13 and 14 adjacent the free ends thereof. Such welded connection is preferably defined by a horizontally elongated weld, and more preferably a vertically-spaced pair of horizontally-elongated welds which connect the ends of the two beams 13 and 14 together. For example, with the arrangement illustrated by FIGS. 1–3, a first horizontally-elongate weld can be provided at the cooperating ends of the beams between the top wall of the rear beam and the top leg of the front beam where these beams nest together, such weld being diagramatically indicated at 20 in FIG. 2, and a similar horizontally-elongate weld can be provided between the bottom wall of the rear beam and the lower leg of the front beam. Such weld arrangement, and the end connection defined thereby, hence prevents relative horizontal translation between the ends of the beams due to imposition of an external impact against the bumper system, and at the same time may permit limited angular displacement between the ends of the connected beams due principally to plastic deformation of the beam material in the vicinity of the end connections, which plastic deformation is effective for absorbing at least some of the external impact energy while permitting other external impact energy to be transmitted through the connection to the inboard beam.

In place of an end connection employing welds as described above, the end connection 17 may involve some type of mechanical interlock between the cooperating ends of the beams, such as a tab on one beam projecting into a slot or groove on the other beam, so as to function in generally the same manner as described above. Further, the mechanical interlock may involve some type of connecting pin or coupling member, such as a square or non-round pin or a press or interference fit pin, which imposes substantial resistance against relative rotation between the connected ends of the beams 13 and 14, which connector hence resists relative translation and/or rotation between the connected ends but permits energy absorption at the connection due to plastic deformation of material associated with the end parts of the beams and/or the connector.

As a still further alternative, the end connector 17 joining the end parts of the beams 13 and 14 may comprise a heavy-duty spring shaped and configured to provide generally the same energy-absorbing function as described above. For example, the spring ends can be anchored or fixed to the connected end parts of the beams.

Regarding the connections 24 between the inboard beam 14 and the frame rails 22, these connections will preferably be initially designed so as to optimize the ability of the inner beam to transmit energy from the end parts to the center part thereof while at the same time permitting the inner beam to effectively absorb impact energy at both the end or outboard parts as well as in the center part thereof. The connection 24 will preferably provide resistance against at least horizontal translation or horizontal rotation so as to permit at least some of the energy transmitted to the outboard parts of the inboard beam 14 to be transmitted along the beam into the center part thereof. The connection 24 may comprise vertical hinge pins which will hence permit limited horizontal rotation but prevent horizontal translation.

As a further and preferred construction in terms of simplicity of vehicle manufacture and assembly, the connection 24 may involve a welded connection between the inboard beam 21 and the rail 22, which welded connection may be similar to spot welds at the points 24, or which welded connection may be defined by a vertically elongate weld between beam 21 and rail 22 which will be effective in preventing relative translation movement but at the same time may permit plastic deformation in the beam at the weld similar to a horizontal flexing movement due to the plastic deformation of the material in the vicinity of the weld. Such vertically elongate weld is diagrammatically shown at 30 in FIG. 2.

Referring to FIG. 2, there is illustrated a variation of the bumper assembly 11 which permits some of the impact forces applied to the outer beam 13 to be short circuited and communicated directly to the rear beam 14 without passing through the end connectors 17. In this variation, a force communicator structure 53, as indicated by dotted lines in FIG. 2, can be disposed within the gap 22 for connection between the front and rear beams at locations spaced inboard from the end connectors 17. The communicator member 53 will typically be sandwiched between the front and rear beams 13 and 14 to provide a partial force-transmitting short circuit from the front beam 13 through the member 53 to the rear beam 14, whereby some impact force and energy hence will be transmitted through the communication member 53, and other of the impact energy will transmit along the beam 13 to the end connectors 17 for application to the ends of the rear beam 14 in the same manner as described above.

The communicator member 53 may be formed as one or more deformable foam or plastic or metal members for connection directly between the front and rear beams and, for example, for connection directly between the center beam portions of the front and rear beams. The communicator 53 will typically be engaged with the rear beam 14 at one or more locations positioned inwardly from the inboard connectors 24. The foam connector member 53 may be of a crescent shape so as to occupy substantially the entire gap between the beams 13 and 14. It will be appreciated that the communication member 53 will permit only part of the impact energy to be transmitted therethrough, and that the geometry of the bumper assembly will be effective with respect to the remaining impact energy so that the bumper assembly functions in the same manner as if the communicator 53 was not present, such as described above.

Referring now to FIGS. 6 and 7, there is illustrated a modified bumper assembly wherein, in this arrangement, the bumper assembly is defined by a front beam 13" and a rear beam 14" which are operatively coupled and mounted in the same manner as illustrated by FIG. 2, and generally have cross sections similar to that illustrated by FIG. 5. In this variation, however, the rear beam 14" has communication or contact blocks or members 51 fixedly mounted thereon in the vicinity of the center of the beam (i.e., substantially at or adjacent the longitudinal centerline 15), and these communication blocks 51 are fixedly secured to and respectively project upwardly and downwardly from the upper and lower walls of the rear beam at a location close to the front wall. With this arrangement, the communication blocks 51 are oriented such that, upon relative deflection of the center portions of the front and rear beams so that they relatively move toward one another into a nesting position, the communicator blocks 51 on the rear beam will contact the rear wall associated with the legs of the front beam, prior to the rear beam fully nesting within the front beam, thereby effectively providing a solid connection between the center portions of the front and rear beams. At this stage the front and rear beams hence effectively function as a single beam so as to effect continued absorption of energy associated with the impact event. This latter stage, wherein the communication blocks 51 contact the rear wall of the front beam, require that the bumper assembly undergo the various energy-absorbing deflecting and deformation stages described above, namely the initial deformation of the front beam followed by deformation of the rear beam and outward bowing of the center portion thereof, so as to cause the communication blocks 51 to contact the front beam so that the two beams thereafter effectively act in unison with respect to further energy absorption.

With the improved bumper assembly of the present invention, the outboard connectors 17 can be effectively tuned during the initial design thereof so as to optimize the moment and hence energy applied from the front beam to the rear beam in accordance with the overall geometry of the bumper system, which tuning can be accomplished by the overall initial design of the connector 17 with respect to the degree of rigidity and elasticity incorporated therein. In addition, the C-shaped and hollow cross sections contemplated for use in forming the front and rear beams also permit the desired absorption of energy due to the deformation of the beam cross-sections, and these configurations together with the coupled relationship of the inner and outer beams and the four-point kinematic connections defined by the connectors 17 and 24 hence maximize the energy absorption capability of the bumper system, and hence the energy absorbing capability thereof prior to the bumper deforming into contact with the end of the vehicle.

While the bumper system in the illustrated embodiments has the ends of the front and rear beams connected at the connectors 17, it will be recognized that one of these beams may have ends which overhang or project outwardly beyond the connectors 17 without detracting from the function of the bumper system as summarized herein.

As is conventional, the front beam 13 can be provided with a suitable covering or cap, such as of a plastic material or the like, so as to provide the bumper with the desired styling and color consistent with the desired visual aspects of the vehicle.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A vehicle bumper system comprising:

an elongate monolithic one-piece outer bumper beam having an upright front wall joined between rearwardly projecting top and bottom walls;

an elongate one-piece inner bumper beam positioned adjacent but rearwardly of said outer bumper beam, said inner bumper beam having end parts at opposite ends thereof which are joined to respective opposite end parts of said outer bumper beam by end connections which permit at least limited force moment-induced, energy-absorbing flexing between adjacent end portions of said outer and inner beams, said end connections being positioned substantially symmetrically on opposite sides of a centerplane of said bumper system;

said inner beam being connected to a vehicle solely at two connecting points which are positioned on opposite sides of said center plane and are each spaced inwardly from a respectively adjacent said end connection, said outer beam being free of direct connection to said vehicle;

said outer beam being of a preshaped horizontally bowed configuration so that an elongate center beam section thereof is bowed outwardly and is physically spaced forwardly from a center beam part of said inner beam which extends between said connecting points;

one of said beams comprising a hollow tube having a generally rectangular cross section, the other of said beams including a cross section which is C-shaped and opens horizontally toward said one beam and is sized to permit at least partial front-to-rear nesting with said one beam, and said end parts of the outer and inner beams being nested one within the other at said end connections; and said outer beam, when subjected to an inward impact, effecting transfer of impact forces along the outer beam to the end connections to cause the center beam part of the inner beam to bow forwardly toward the center beam section of said outer beam.

2. A vehicle bumper system according to claim 1, wherein the inner beam includes a pair of cantilevered end beam parts which each extend from one connecting point to the adjacent end connection, said end beam parts of said inner beam elastically deflecting rearwardly about the respective connecting point as the center beam part bows forwardly in response to imposition of an external impact against said outer beam.

3. A vehicle bumper system according to claim 1, wherein each of said beams comprises a one-piece roll formed steel member, and each of said beams has a yield strength of at least 100 ksi.

4. A vehicle bumper system according to claim 3, wherein a deformable energy-absorbing communication member is connected between said center beam section and said center beam part to permit limited direct energy transfer therethrough upon external impact against said outer beam, and/or a blocking member is mounted on one of said center beam section and said center beam part and is positioned for blocking engagement with the other of said center beam section and said center beam part as they move toward one another.

5. A vehicle bumper system according to claim 2, wherein said outer beam is C-shaped in cross section and defines an elongate recess which opens rearwardly toward said inner beam;

wherein said inner beam comprises said hollow tube which is sized such that the end beam parts thereof are nested within said recess; and wherein said outer beam is preshaped into a horizontal arc-shaped configuration so that the center beam section is bowed horizontally forwardly away from said inner beam and is maintained in a generally non-deflected condition when assembled with said inner beam.

6. A vehicle bumper system according to claim 5, wherein each of said outer and inner beams is of substantially uniform cross section throughout the lengthwise extent thereof.

7. A vehicle bumper system according to claim 5, wherein each said end connection comprises a first fulcrum-like connection defined by a weld between said inner and outer beams.

8. A vehicle bumper system according to claim 5, wherein each said connecting point comprises a second fulcrum-like connection defined by a weld between said inner beam and mounting part on said vehicle.

9. A vehicle bumper system according to claim 8, wherein each said end connection comprises a first fulcrum-like connection defined by a weld between said inner and outer beams.

10. A vehicle bumper system according to claim 1, wherein each said end connection comprises a first fulcrum-like connection defined by a horizontally elongate weld between said inner and outer beams.

11. A vehicle bumper system according to claim 10, wherein each said connecting point comprises a second fulcrum-like connection defined by a vertically elongate weld between said inner beam and a vehicle mounting part.

12. A vehicle bumper system according to claim 1, wherein each said connecting point comprises a fulcrum-like connection defined by a vertically elongate weld between said inner beam and a vehicle mounting part.

13. A vehicle bumper system according to claim 1, wherein said center beam part and said center beam section can relatively move into at least partial nested engagement with one another in response to an external impact on said outer bumper beam.

14. A vehicle bumper system according to claim 1, wherein said other beam of C-shaped cross section comprises said outer bumper beam, and wherein said one beam comprising said hollow tube defines said inner beam.

* * * * *

UNITED STATES PATENT AND TRADEMARK OFFICE
CERTIFICATE OF CORRECTION

PATENT NO. : 6,764,119 B2
DATED : July 20, 2004
INVENTOR(S) : Jeffrey L. Bladow et al.

It is certified that error appears in the above-identified patent and that said Letters Patent is hereby corrected as shown below:

Title page,
Item [75], Inventors, please change, "Jeffrey L. Bladow, West Bloomfield, MI (US); Tad V. Machrowicz, Hortonville, MI (US); Steven N. Fidh, Ann Arbor, MI (US)"

to -- Jeffrey L. Bladow, West Bloomfield, MI (US); Tad V. Machrowicz, Ortonville, MI (US); Steven N. Fidh, Ann Arbor, MI (US) --.

Column 10,
Lines 33-34, change "and mounting" to -- and a mounting --.

Signed and Sealed this

Twenty-second Day of February, 2005

JON W. DUDAS
*Director of the United States Patent and Trademark Office*